United States Patent
Turechek et al.

(10) Patent No.: US 10,816,125 B2
(45) Date of Patent: Oct. 27, 2020

(54) HIGH PRESSURE PLUG

(71) Applicant: Engineered Inserts & Systems, Inc., Watertown, CT (US)

(72) Inventors: David P. Turechek, Shelton, CT (US); Victor Kirilichin, Madison, CT (US)

(73) Assignee: Engineered Inserts & Systems, Inc., Watertown, CT (US)

( * ) Notice: Subject to any disclaimer, the term of this patent is extended or adjusted under 35 U.S.C. 154(b) by 0 days.

(21) Appl. No.: 16/235,527

(22) Filed: Dec. 28, 2018

(65) Prior Publication Data

US 2019/0331280 A1    Oct. 31, 2019

Related U.S. Application Data

(60) Provisional application No. 62/663,542, filed on Apr. 27, 2018.

(51) Int. Cl.
*F16L 55/11* (2006.01)

(52) U.S. Cl.
CPC ............................... *F16L 55/1108* (2013.01)

(58) Field of Classification Search
CPC ....... B25B 13/06; B23P 11/00; F16L 55/1108; F16K 1/48; F16K 1/482; F16K 1/02; E04G 17/064
USPC .......................................... 29/253, 255, 272
See application file for complete search history.

(56) References Cited

U.S. PATENT DOCUMENTS

| | | | |
|---|---|---|---|
| 3,030,702 A | 4/1962 | Fowler | |
| 3,451,583 A | 6/1969 | Lee | |
| 3,525,365 A | 8/1970 | Meulendyk et al. | |
| 3,674,055 A * | 7/1972 | Ray | F16L 55/132 138/89 |
| 4,091,841 A | 5/1978 | Beneker et al. | |
| 4,114,654 A | 9/1978 | Richardson | |
| 4,421,137 A | 12/1983 | Nusbaumer et al. | |
| 4,426,758 A | 1/1984 | Castoe | |
| 4,584,755 A | 4/1986 | Lundquist | |

(Continued)

FOREIGN PATENT DOCUMENTS

| | | |
|---|---|---|
| CN | 101775982 A | 7/2010 |
| DE | 202005000521 U1 | 3/2005 |

(Continued)

OTHER PUBLICATIONS

Translation of WO2014170339 retrieved from Espacenet on Sep. 25, 2019 (Year: 2014).*

(Continued)

*Primary Examiner* — Orlando E Aviles
*Assistant Examiner* — Thomas Raymond Rodgers
(74) *Attorney, Agent, or Firm* — St. Onge Steward Johnston & Reens, LLC

(57) ABSTRACT

An insert for sealing a hole having a diameter. The insert includes a plug having a maximum outer diameter that is equal to or less than the diameter of the hole. The plug also has a sleeve, a core, and a pin. The sleeve has a length and a void. The core and the pin are both press-fit into the void at opposite ends of the void. The core has a first length, a first tapered outer wall, and a threaded hole extending partly through the core. The pin has a second length, a second tapered outer wall, and a passage extending there-through. The plug also has protrusions located on an outer surface of the sleeve.

23 Claims, 6 Drawing Sheets

(56) References Cited

U.S. PATENT DOCUMENTS

| | | | |
|---|---|---|---|
| 4,751,944 A * | 6/1988 | Sinha | B25B 27/02 138/89 |
| 5,038,819 A | 8/1991 | Sutphen | |
| 5,114,158 A | 5/1992 | Le | |
| 5,715,598 A | 2/1998 | Everett et al. | |
| 5,779,085 A | 7/1998 | Havlinek et al. | |
| 6,076,797 A | 6/2000 | Schnautz | |
| 8,016,033 B2 | 9/2011 | Iblings et al. | |
| 8,556,102 B2 | 10/2013 | Hersant et al. | |
| 10,040,182 B2 | 8/2018 | Kirilichin | |
| 2015/0202754 A1 | 7/2015 | Kirilichin et al. | |

FOREIGN PATENT DOCUMENTS

| | | |
|---|---|---|
| WO | 2014167037 A1 | 10/2014 |
| WO | WO-2014170339 A1 * | 10/2014 |

OTHER PUBLICATIONS

Translation of WO2014170339 with highlighted sections (Year: 2014).*

* cited by examiner

HIGH PRESSURE PLUG

FIELD OF THE INVENTION

The present invention relates to a plug and a system and method for installing the plug. Particularly, the plug may be designed to seal holes in manifolds or other devices that require a plug that can withstand high pressures, such as a hydraulic manifold.

BACKGROUND OF THE INVENTION

There are various plug and sealing systems generally known. For example, some plugs include a sleeve having a threaded core that is designed to be pulled into the sleeve to expand the sleeve against the inner walls of the hole, creating a hermetic seal. While these plugs are relatively easy to manufacture and install, they lack the capacity to withstand the very high pressures associated with certain manifold systems. Accordingly, it is desirable to provide an insert and sealing system that can withstand very high pressures while still permitting easy manufacturing and installation.

SUMMARY OF THE INVENTION

Therefore, it is an object of the present invention to provide a plug that can withstand very high pressures.

It is yet another object of the present invention to provide systems and methods for installing the plug using an installation device.

These and other objects are achieved by providing a system for sealing a hole having a diameter. The system includes a plug and an installation device. The plug includes a sleeve, a core, and a pin. The sleeve has a length and a void. The core and the pin are positioned in the void at opposite ends of the void. The core has a length, a tapered outer wall, and a threaded hole extending partly through the core. The pin has a length, a tapered outer wall, and a through-hole. A maximum outer diameter of the plug is equal to or less than the diameter of the hole. The installation device includes a drive; an end piece having a bore and a distal surface having a dimension that is larger than a dimension of the pin; and a pull-rod coupled to the drive and passing through the bore, the pull-rod having a threaded end. The pull-rod is insertable through the through-hole of the pin, threadable into the threaded hole of the core, and retractable by the drive to pull the core into the sleeve and push the pin into the sleeve thereby expanding the sleeve against the hole.

In some embodiments, the system also includes a spacer having a through-hole and a surface with a dimension that is larger than the diameter of the hole. The pull-rod is insertable through the through-hole of the spacer such that the surface of the spacer bears against a surface of the pin to push the pin into the sleeve.

In some embodiments, the core and the pin are both press-fit into the sleeve with the threaded hole facing the pin and the core and the pin both extending outwards away from the sleeve.

In some embodiments, the core also includes a stop positioned at an end of the core opposite the threaded hole. The stop has a diameter that is greater than a diameter of the void of the sleeve.

In some embodiments, the stop of the core has a thickness that is at least 10% of the length of the core. In other embodiments, the stop has a thickness that is at least 12% of a diameter of the threaded hole.

In some embodiments, the sleeve also includes protrusions located on an outer surface of the sleeve.

In some embodiments, the ratio of the length of the core to the length of the sleeve is in the range of about 0.3:1 to 0.7:1. In other embodiments, the ratio of the length of the pin to the length of the sleeve is in the range of about 0.3:1 to 0.7:1.

In an alternative embodiment of the present invention, an insert for sealing a hole having a diameter is provided. The insert includes a plug having a sleeve, a core, and a pin. The sleeve has a length and a void. The core and the pin are positioned in the void at opposite ends of the void. The core has a first length, a first tapered outer wall, and a threaded hole extending partly through the core. The pin has a second length, a second tapered outer wall, and a passage extending there-through.

In some embodiments, the insert also includes protrusions located on an outer surface of the sleeve.

In some embodiments, each of the first and second lengths are approximately equal to one-half the length of the sleeve.

In some embodiments, the insert also includes a stop located on an end of the core. The stop inhibits the core from being pulled into the sleeve beyond the stop to enable the pin to be forced into the sleeve when the core and sleeve are pulled together.

In some embodiments, the core and the pin are both press-fit into the sleeve with the threaded hole facing the pin and the core and the pin both extending outwards away from the sleeve prior to being installed to seal the hole.

In some embodiments, the core has first and second ends. The threaded hole is centrally located in the first end. The second end has a thickness at a center thereof which is at least 10% of the first length. In some embodiments, the thickness of the second end of the core is at least 14% of the first length. In other embodiments, the thickness of the second end of the core is at least 12% of a diameter of the threaded hole.

In yet another embodiment of the present invention, a method of sealing a hole having a diameter is provided. The method including the steps of placing a plug in the hole, the plug includes a sleeve, a core, and a pin, the sleeve having a length and a void, the core and the pin positioned in the void at opposite ends of the void, the core having a first length, a first tapered outer wall, and a threaded hole extending partly through the core, the pin having a second length, a second tapered outer wall, and a through-hole, wherein a maximum outer diameter of the plug is equal to or less than the diameter of the hole; inserting a pull-rod of an installation device through the through-hole of the pin, the pull-rod having a threaded end; threading the threaded end of the pull-rod into the threaded hole of the core such that a distal surface of an end piece of the installation device bears against a surface of the pin, wherein a dimension of the distal surface is larger than a dimension of the pin; retracting the pull-rod to pull the core into the sleeve and push the pin into the sleeve thereby expanding the sleeve against the hole; unthreading the threaded end of the pull-rod from the threaded hole of the core; and removing the pull-rod from the plug.

In some embodiments, the method also includes the steps of inserting the pull-rod through a through-hole of a spacer, the spacer including a surface having a dimension that is larger than the diameter of the hole; threading the threaded end of the pull-rod into the threaded hole of the core such that the surface of the spacer bears against the surface of the pin; retracting the pull-rod to farther pull the core into the sleeve and farther push the pin into the sleeve thereby farther expanding the sleeve against the hole; unthreading the threaded end of the pull-rod from the threaded hole of the core; and removing the pull-rod from the plug.

In some embodiments, prior to the placing step, the core and the pin are both press-fit into the sleeve with the threaded hole facing the pin and the core and the pin both extending outwards away from the sleeve.

Other objects of the present invention and its particular features and advantages will become apparent from the following detailed description, claims, and accompanying drawings.

DETAILED DESCRIPTION OF THE INVENTION

Figure 1:
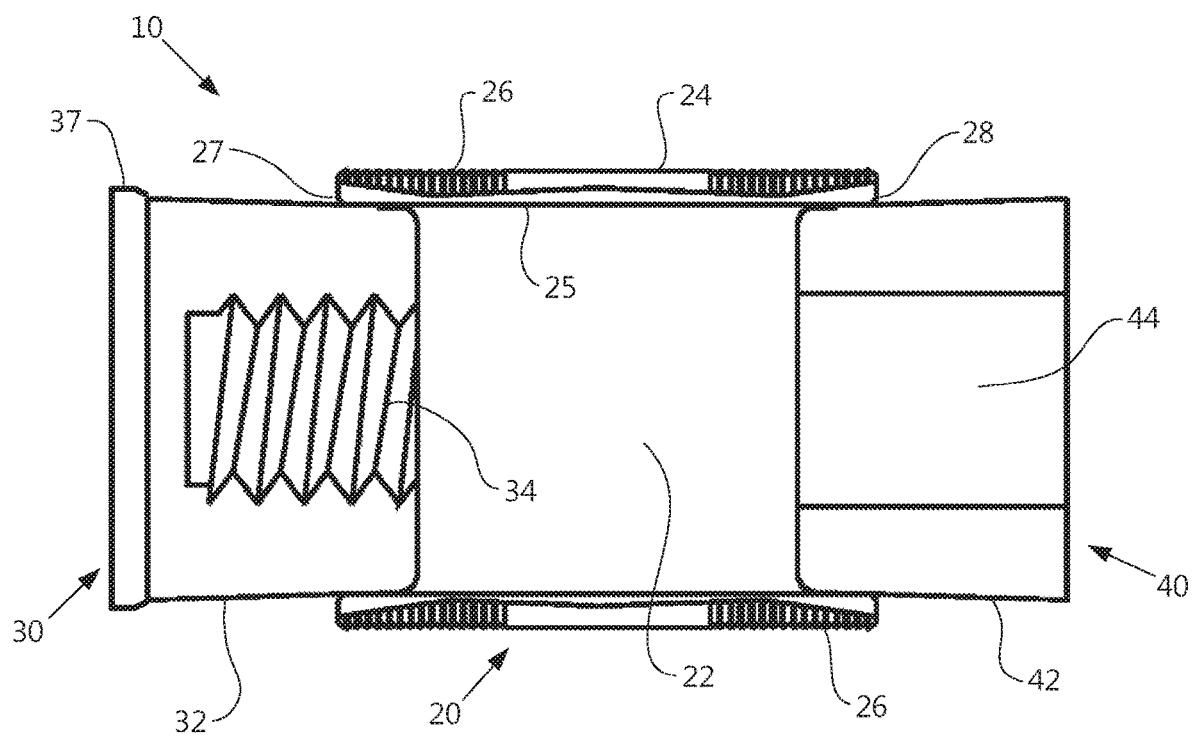
FIG. 1 is a side cross-sectional view of a plug according to an embodiment of the present invention.

Referring now to the drawing figures, wherein like reference numerals designate corresponding structures throughout the views. The following examples are presented to further illustrate and explain the present invention and should not be taken as limiting in any regard.

Figure 2:
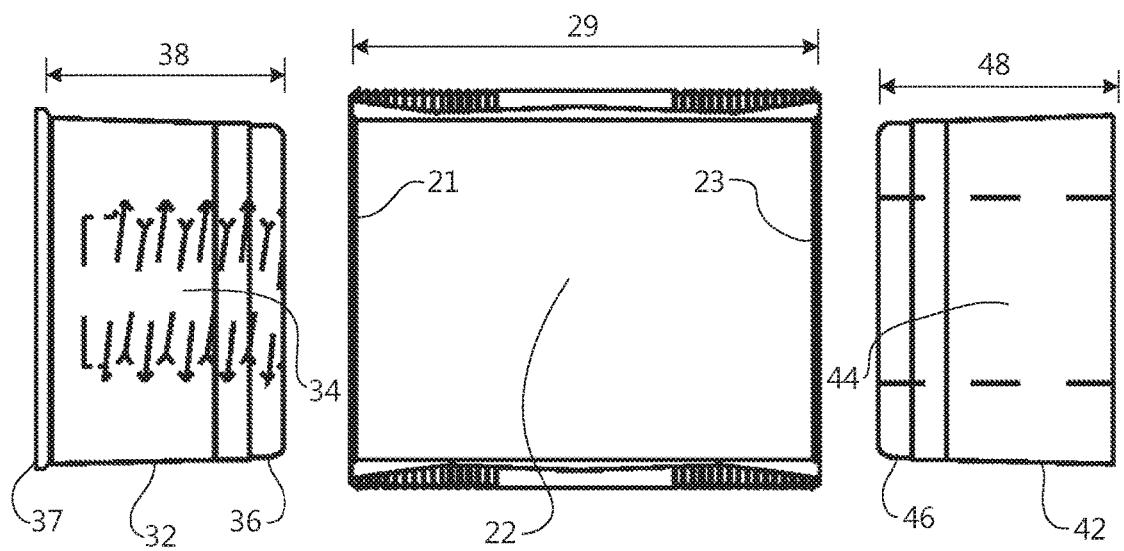
FIG. 2 is an exploded side cross-sectional view of the plug shown in FIG. 1.

FIGS. 1 and 2 depict a plug 10 according to an embodiment of the present invention. The plug 10 includes a sleeve 20, a core 30, and a pin 40. Sleeve 20 has a void 22 passing through the sleeve 20, a wall 25 surrounding the void 22, and an outer surface 24, which may include ridges or rings 26. The ridges 26 protrude out from the outer surface 24 to interact with the wall 51 of an installation hole 50 to better secure or seal the plug 10 to the installation hole 50. As shown, the rings 26 are each separate from one another in order to act as leak stops as opposed to being threaded which would create a leak path of helical shape. Thus, the series of rings 26 provide additional resistance and friction against the wall 51 of the installation hole 50. Although rings are shown, it is understood that other textures can be used on the outer surface 24 of the sleeve 20.

The core 30 has a tapered wall 32 and a recess 34. Core 30 is insertable into the void 22 at a first end 27 of the sleeve 20. The recess 34 can releasably secure to an installation device. The recess 34 does not extend all the way through the core 30. In preferred embodiments, the recess 34 is threaded to provide the releasable securing. In some embodiments, the recess 34 includes alternative structures that provide for releasable securing of the plug. For example, the recess 34 may have a groove cut out that can interact with a catch that extends and retracts from the installation device. Preferably, the end of the core 30 that includes the threaded hole 34 is press-fit into one end of the sleeve prior to installation of the insert 10 into installation hole 50.

The pin 40 has a tapered wall 42 and a passage 44. Pin 40 is insertable into the void 22 at a second end 28 of the sleeve 20. In preferred embodiments, the passage 44 extends all the way through the pin 40 to permit a part of the installation device to pass through the pin 40 and interact with the recess 34 of the core 30. Preferably, one end of the pin 40 (the end with the smaller diameter) is press-fit into the sleeve 20 prior to installation of the insert 10 into installation hole 50.

Figure 6:
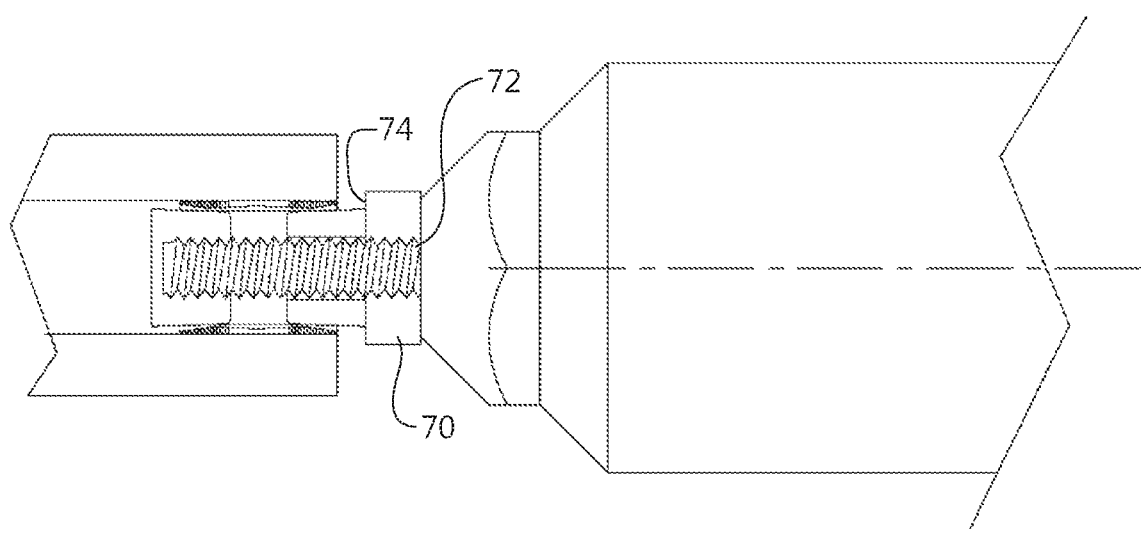
FIG. 6 is a side partial cross-sectional view of the plug shown in FIG. 5 after a spacer has been attached to the installation device and the installation device re-secured to the plug.
Figure 7:
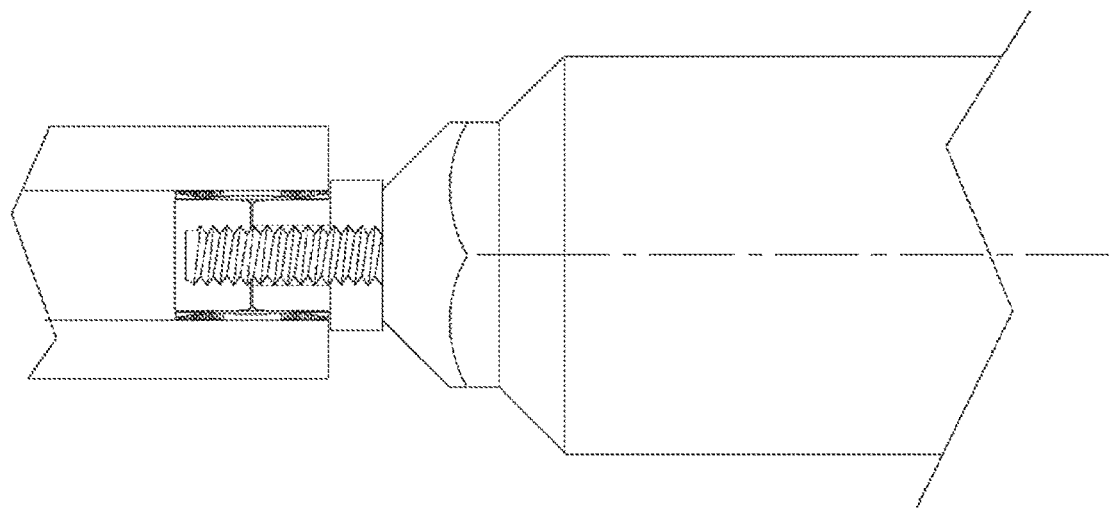
FIG. 7 is a side partial cross-sectional view of the plug shown in FIG. 6 after the part of the installation device has been retracted.
Figure 8:
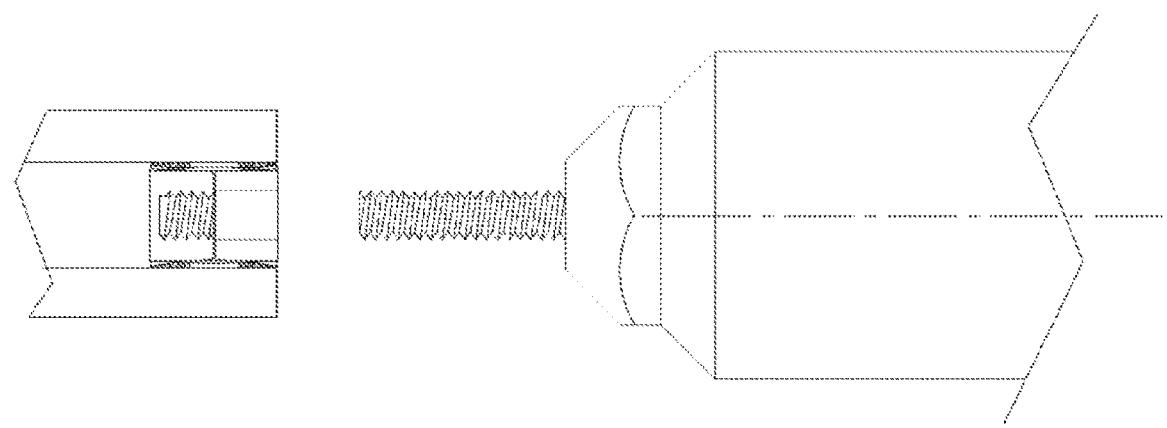
FIG. 8 is a side partial cross-sectional view of the plug shown in FIG. 7 installed in the installation hole after the installation device has released from the plug.

In preferred embodiments, the taper angle of tapered walls 32 and 42 are approximately equal to ensure that equal force is required to move the core/pin an equal distance. Thus, when moving from the position in FIG. 5 to the position in FIG. 6, the core 30 and pin 40 preferably move the same distance into the sleeve 20. This ensures that when installation of the plug 10 is finished, the outer ends of the tapered walls 32 and 42 are flush with their respective ends 27/28 of the sleeve 20, as depicted in FIGS. 7-8.

Figure 9A:
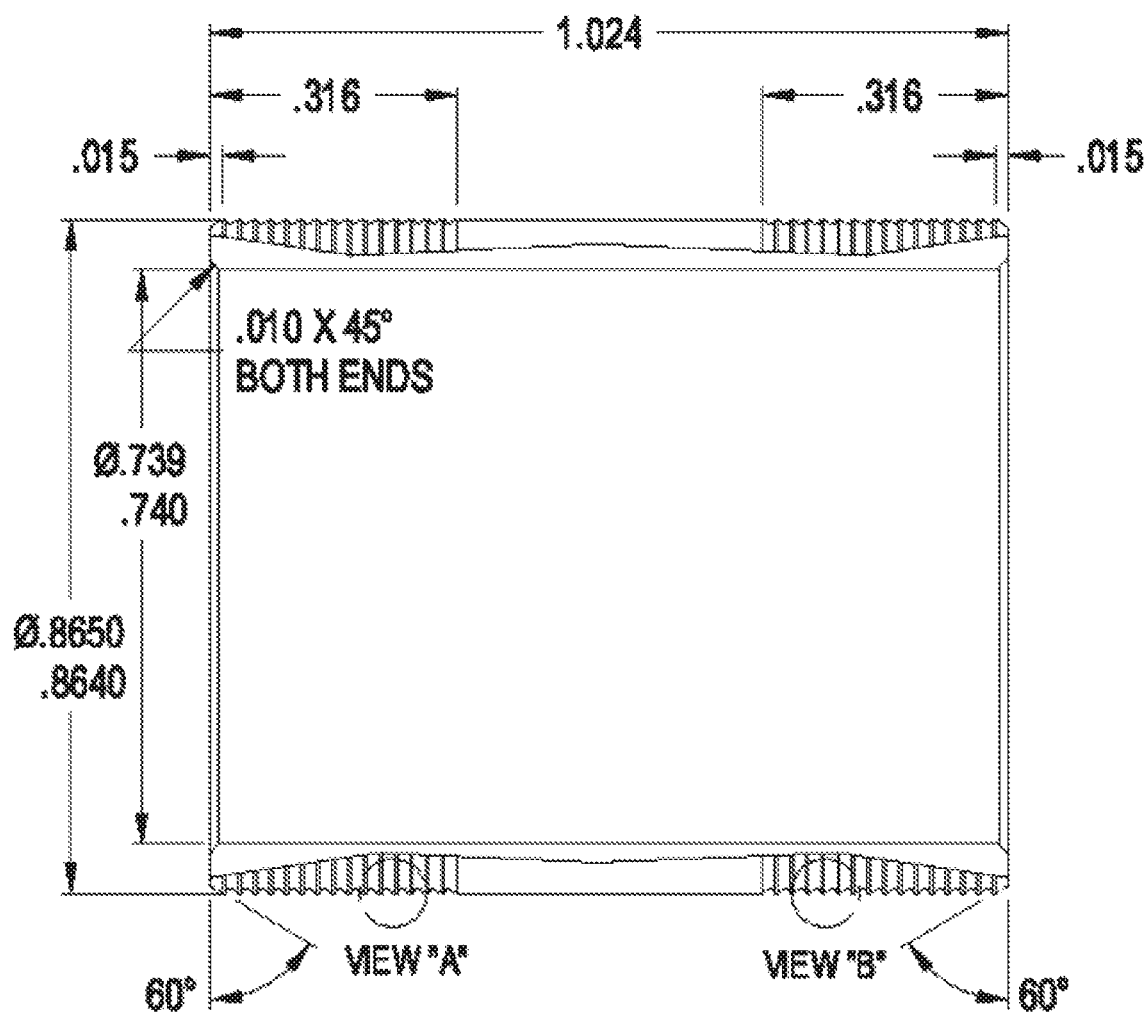
FIG. 9a is a side cross-sectional view of a sleeve of a plug with dimensions exemplary of an embodiment of the present invention.
Figure 9B:
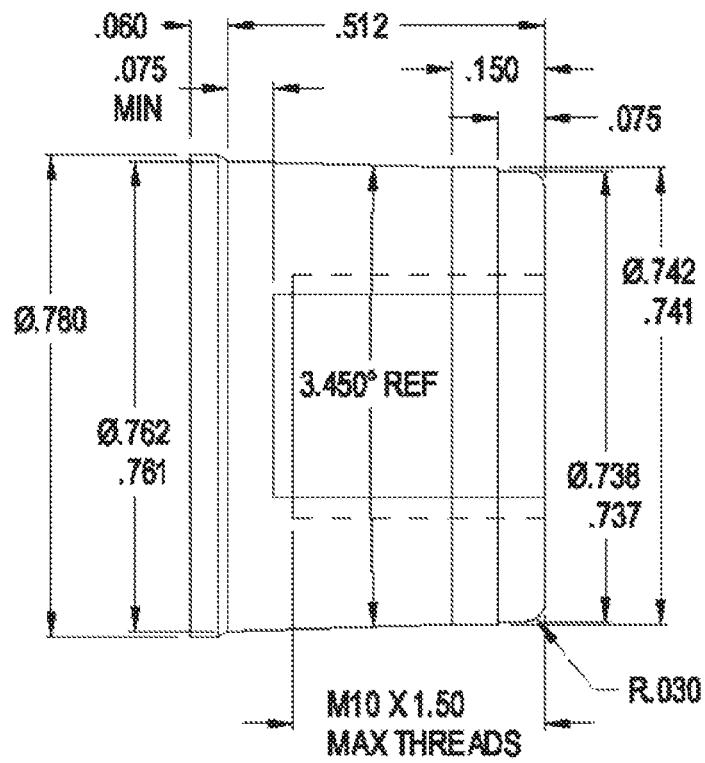
FIG. 9b is a side cross-sectional view of a core of a plug with dimensions exemplary of an embodiment of the present invention.

In preferred embodiments, the core 30 also includes a stop 37 at the outer end of tapered wall 32. The diameter of the stop 37 is greater than the diameter of the void 22. The stop 37 prevents the core 30 from being over-inserted into the sleeve 20 and pushing the pin 40 out of the sleeve 20, which could occur when the plug 10 is subjected to extremely high pressure after installation. Additionally, the stop 37 ensures that core 30 and pin 40 are inserted an approximately equal depth into the sleeve 20. For example, when the stop 37 contacts the bottom face of the sleeve 27, movement of the core 30 into the sleeve 20 is inhibited such that pin 40 is pushed into the sleeve 20. This ensures that the pin 40 and core 30 when finally installed are approximately flush with the outer 28 and inner 27 edges of the sleeve 20. The stop 37 is preferably provided as a step-up diameter or a significantly larger taper angle as opposed to that of the sleeve 20 and core 30. The diameter of the stop 37 may be: at least 1% larger than, at least 1.5% larger than, at least 2% larger than, or in the range of 1-7%, or more preferably 1.5-4%, or even more preferably approximately 2.5% larger than, the maximum diameter of the tapered wall 32. Preferably, the stop 37 starts at its proximal end with a steeper taper and then to a constant diameter portion, thus, as shown in FIG. 9b, the maximum diameter of the tapered wall 32 is 0.761 inches and the diameter of the stop 37 is 0.780 inches. However, these dimensions are merely exemplary.

In preferred embodiments, the sleeve 20 also includes lips 21 and 23 located at either end of the void 22. The core 30 and pin 40 preferably include corresponding lips 36 and 46 that interact with lips 21 and 23 to prevent or resist the possibility that the core 30 and the pin 40 can be extracted from the sleeve 20. In preferred embodiments, part of the lips 36/46 each have a portion with a constant diameter, as depicted in FIG. 2. This portion with a constant diameter can be the part that is press-fit into the sleeve 20 prior to installation and sealing of the plug 10 into installation hole 50.

Sleeve 20 has a length 29, core 30 has a length 38, and pin 40 has a length 48. Lengths 38 and 48 represent a measurement from the inner ends of lips 36 and 46 to the outer ends of tapered walls 32 and 42, such that in preferred embodiments length 38 does not include stop 37 or is measured to the proximal end of the stop 37. In preferred embodiments, stop 37 has a thickness that is at least 10% of the length 38 of the core 30. In some embodiments, the thickness of stop 37 is at least 14% of the length 38. In other embodiments, the thickness of stop 37 is at least 12% of the diameter of the recess 34 of the core 30.

Figure 9C:
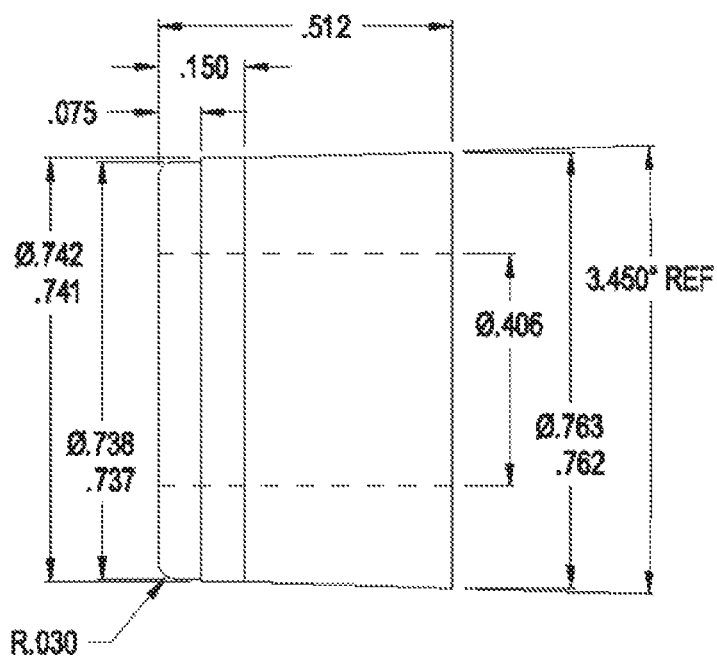
FIG. 9c is a side cross-sectional view of a pin of a plug with dimensions exemplary of an embodiment of the present invention.

Length 29 varies depending on the application. For example, length 29 can be increased to account for more ridges 26, thus providing more contact area with the wall 51 of the installation hole 50. Lengths 38 and 48 are determined by ratios to the length 29. Preferably, the ratio of the length 38 of the core 30 to the length 29 of the sleeve 20 is in the range of about 0.3:1 to 0.7:1. Likewise, the ratio of the length 48 of the pin 40 to the length 29 of the sleeve 20 is preferably in the range of about 0.3:1 to 0.7:1. FIGS. 9a-9c shows an exemplary embodiment of the present invention where lengths 38 and 48 are equal, each having about a 0.5:1 ratio to the length 29 of the sleeve 20. Thus, in preferred embodiments, the length 29 is approximately equal to the sum of lengths 38 and 48 such that when fully installed, the inner facing ends of the pin 40 and core 30 are in contact and the outer ends of the tapered walls 32 and 42 are flush with their respective ends 27/28 of the sleeve 20, as depicted in FIGS. 7-8. In other embodiments, lengths 38 and 48 are unequal.

Figure 3:
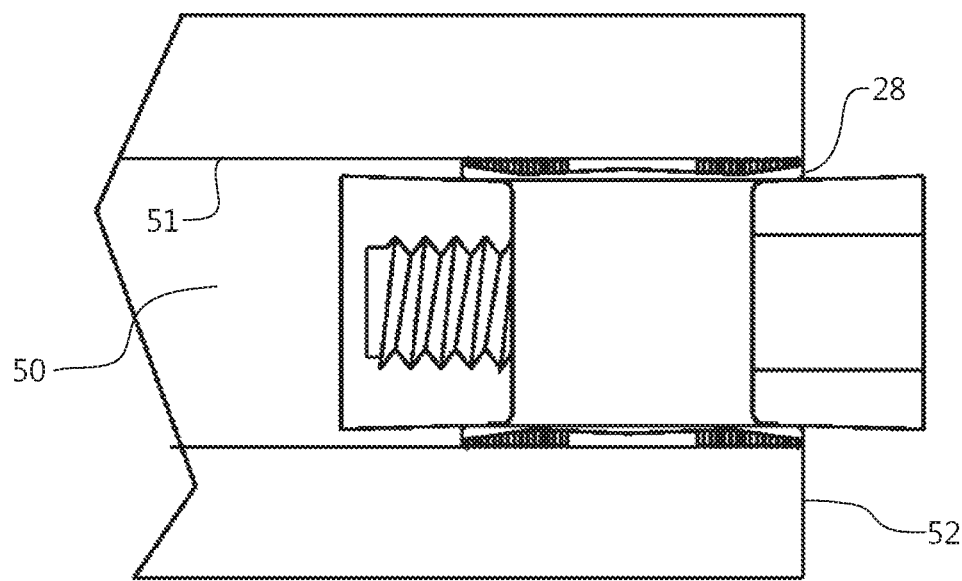
FIG. 3 is a side cross-sectional view of the plug shown in FIG. 1 inserted in an installation hole.

FIGS. 3-8 depict a method of installing a plug in a hole according to the present invention. FIG. 3 depicts the plug 10 inserted into an installation hole 50. When inserted into the installation hole 50, the second end 28 of the sleeve 20 is substantially flush with a surface 52 surrounding the installation hole 50. The plug 10 is designed to fit snuggly in the installation hole 50 to prevent or resist the plug 10 falling deeper into the installation hole 50 and possibly blocking a working channel of the manifold. Also, the plug 10 fits into the installation hole 50 easily enough to permit manual insertion, but mechanical insertion means are also contemplated, such as by robotic arms.

Figure 4:
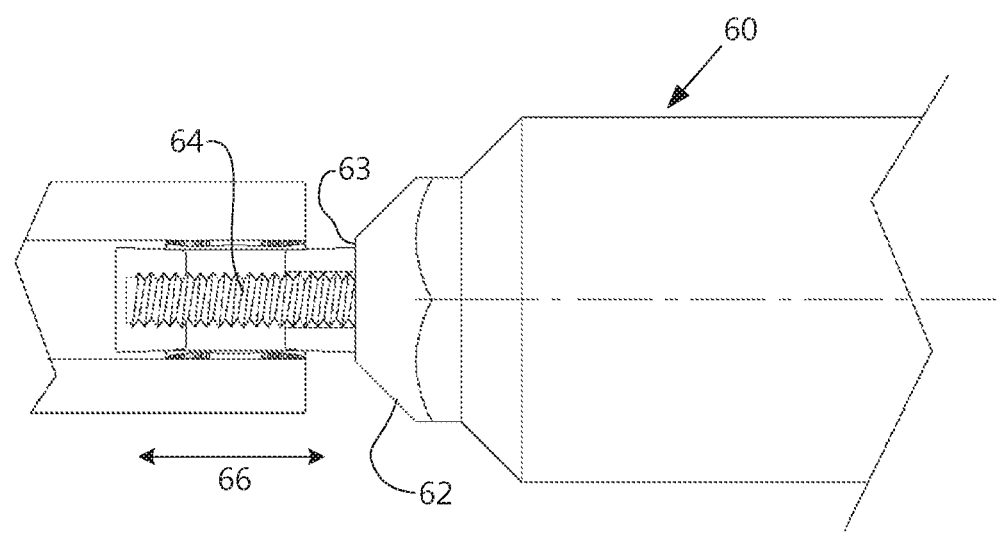
FIG. 4 is a side partial cross-sectional view of an installation device secured to the plug shown in FIG. 3.
Figure 5:
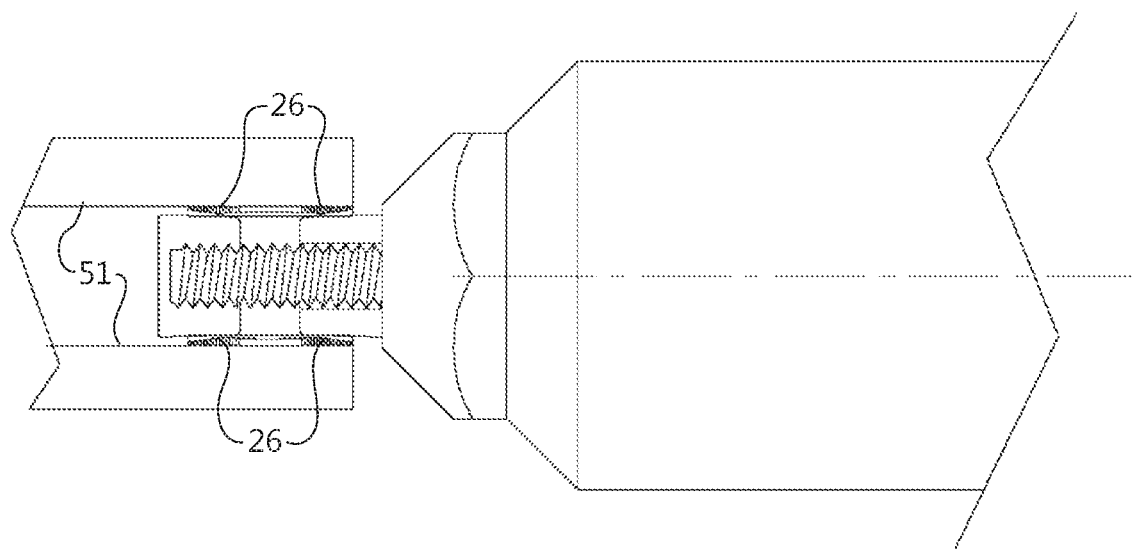
FIG. 5 is a side partial cross-sectional view of the plug shown in FIG. 4 after a part of the installation device has been retracted.

FIG. 4 shows an installation device 60 releasably secured to the plug 10 via interaction with the recess 34 of the core 30. The installation device is of the type described in U.S. Pat. No. 10,040,182, the contents of which are incorporated herein by reference. Installation device 60 includes an end piece 62 having a pull-rod 64 that interacts with the recess 34. As shown, the pull-rod 64 has a male-threaded section that can be rotated to interact with the female-threaded section of recess 34. The pull-rod 64 can also be translated along the axis shown by arrow 66. When pull-rod 64 is fully secured within recess 34, the distal surface 63 of end piece 62 of the installation device 60 is in contact with an outer surface of the pin 40, as depicted in FIGS. 4-5. It is contemplated that various size pull-rods having a variety of lengths can be supplied. It is also understood that the installation device 60 includes appropriate drives, sensors, and controls to rotate and translate the pull-rod 64 for installation of the plug 10.

FIG. 5 shows the core 30 and pin 40 partly inserted in the sleeve 20 after the pull-rod 64 has been retracted. With the pull-rod 64 extended through the passage 44 and secured in the recess 34, the installation device 60 retracts the pull-rod 64 along the axis shown by arrow 66. As the pull-rod 64 retracts, the core 30 is pulled into the sleeve 20. Also, because distal surface 63 of the end piece 62 of the installation device 60 is in contact with the pin 40, the end piece 62 bears against the pin 40 and pushes the pin 40 into the sleeve 20 as the pull-rod 64 retracts. Thus, equal force is applied to the core 30 and the pin 40, ensuring approximately equal insertion distances within the sleeve 20. As the core 30 and the pin 40 are farther inserted into the sleeve 20, the tapered walls 32 and 42 force the wall 25 and outer surface 24 of the sleeve 20 to expand and push the ridges 26 against the wall 51 of installation hole 50, thereby creating a seal that can withstand very high pressures. Preferably, the insert 10 can withstand blow-out pressures of 60,000 psi or higher.

After the pull-rod 64 has been retracted, the installation device 60 reverses rotation of the male-threaded section to unthread the pull-rod 64 from the plug 10. If one stoke from the installation device 60 results in the pin 40 being substantially flush with the surface 52 surrounding the installation hole 50, then installation of the plug 10 may be complete. However, it is contemplated that installation devices lack the force or travel necessary to fully install the plug 10 in one stroke. When a second stroke of the installation device 60 is required, a spacer 70 may be installed to the distal surface 63 of the end piece 62 of the installation device 60, as depicted in FIG. 6. Spacer 70 has a through-hole 72 and a surface 74 having a dimension greater than the diameter of the installation hole 50. The spacer 70 is needed to fill the gap between the pin 40 and end piece 62 when the pull-rod 64 is re-secured to the recess 34. Because the core 30 and the pin 40 have been moved closer together, the end piece 62 will not bear against the pin 40 when the pull-rod 64 is re-secured to the recess 34. Thus, the spacer 70 has a thickness equal to the gap, such that the surface 74 of the spacer 70 bears against the pin 40 to ensure that the pin 40 is pushed into the sleeve 20 as the core 30 is pulled into the sleeve 20 when the pull-rod 64 is retracted again. After complete retraction, the spacer 70 is removed.

In other embodiments of the present invention, the pull-rod 64 is replaceable with a shorter pull-rod, such that the spacer 70 is not needed because there would be no gap between the end piece 62 and pin 40.

FIG. 7 shows the core 30 and the pin 40 fully inserted into the sleeve 20 after the pull-rod 64 has been retracted. FIG. 8 shows the plug 10 fully installed in the installation hole 50 after the pull-rod 64 has been released from the plug 10 and the spacer 70 removed.

Although generally round plugs have been shown, it is understood that the geometry of the plug can change to correspond to the hole to be sealed. It is further understood that various types of drives may be employed with the installation device, for example hydraulic or electric motor drives.

Although the present invention has been described with reference to particular arrangements of parts, features, and the like, these are not intended to exhaust all possible arrangements or features. Indeed, many other modifications and variations will be ascertainable to those skilled in the art.

What is claimed is:

1. A system for sealing a hole having a diameter comprising:
    a plug including a sleeve, a core, and a pin, the sleeve having a length and a void with the core and the pin positioned in the void at opposite ends of the void, the core having a length, a tapered outer wall, and a threaded hole extending partly but not all the way through the core, the pin having a length, a tapered outer wall, and a through-hole, wherein a maximum outer diameter of the plug is equal to or less than the diameter of the hole wherein the core and pin are respectively at positions in which both are press-fit into the sleeve with the threaded hole facing the pin and the core and pin both extending outwards away from the sleeve, and the sleeve is metallic wherein the length of the sleeve is longer than the length of the core and the length of the pin;

an installation device having a drive;

an end piece coupled to said installation device and including a bore and a distal surface wherein a dimension of the distal surface is larger than a dimension of the pin;

a pull-rod coupled to said drive and passing through said bore, the pull-rod having a threaded end; and the pull-rod being insertable through the through-hole of the pin, threadable into the threaded hole of the core, and retractable by the drive to pull the core into the sleeve and push the pin into the sleeve so that the core and pin each move into and relative to the sleeve from their respective press-fit positions to expand the sleeve against the hole and wherein after removal of the pull-rod from the insert, the hole is sealed by the insert.

2. The system of claim 1, further comprising:

a spacer having a through-hole and a surface having a dimension that is larger than the diameter of the hole; and the pull-rod insertable through the through-hole of the spacer such that the surface of the spacer bears against a surface of the pin to push the pin into the sleeve.

3. The system of claim 1, wherein the core further comprises a stop positioned at an end of the core opposite the threaded hole, the stop having a diameter that is greater than a diameter of the void of the sleeve.

4. The system of claim 3, wherein the stop having a thickness that is at least 10% of the length of the core.

5. The system of claim 3, wherein the stop having a thickness that is at least 12% of a diameter of the threaded hole.

6. The system of claim 1, wherein the sleeve further comprises protrusions located on an outer surface of the sleeve.

7. The system of claim 1, wherein the ratio of the length of the core to the length of the sleeve is in the range of 0.3:1 to 0.7:1.

8. The system of claim 1, wherein the ratio of the length of the pin to the length of the sleeve is in the range of 0.3:1 to 0.7:1.

9. An insert for sealing a hole having a diameter comprising:

a plug including a sleeve, a core, and a pin, the sleeve having a length and a void and the sleeve being metallic;

the core and the pin respectively at positions press-fit in the void at opposite ends of the void;

the core having a first length, a first tapered outer wall, and a threaded hole extending partly but not all the way through the core;

the pin having a second length, a second tapered outer wall, and a passage extending there-through;

the pin and core configured to be moved closer together and to move relative to the sleeve from their press-fit positions in order to expand the sleeve and wherein the insert is configured such that when the threaded hole is vacant and the sleeve is expanded against the hole, the hole is sealed wherein the length of the sleeve is longer than the first length of the core and the second length of the pin.

10. The insert of claim 9, further comprising protrusions located on an outer surface of the sleeve.

11. The insert of claim 9, wherein each of the first and second lengths are equal to one-half the length of the sleeve.

12. The insert of claim 9, further comprising a stop located on an end of the core, the stop inhibiting the core from being pulled into the sleeve beyond the stop to enable the pin to be forced into the sleeve when the core and sleeve are pulled together.

13. The insert of claim 9, wherein the core and pin are both press-fit into the sleeve with the threaded hole facing the pin and the core and pin both extending outwards away from the sleeve prior to being installed to seal the hole.

14. The insert of claim 9, wherein the core has first and second ends, the threaded hole centrally located in the first end and the second end having a thickness at a center thereof which is at least 10% of the first length.

15. The insert of claim 14, wherein the thickness of the second end of the core is at least 14% of the first length.

16. The insert of claim 14, wherein the thickness of the second end of the core is at least 12% of a diameter of the threaded hole.

17. The insert of claim 9, wherein when the insert is fully installed in the hole; a first outer end of the first tapered outer wall is flush with a first end of the sleeve, and a second outer end of the second tapered outer wall is flush with a second end of the sleeve.

18. The insert of claim 9 wherein the core and pin are configured to be moved together by engagement with the threaded hole to thereby expand the sleeve against the hole to seal the hole, and wherein the hole remains sealed when the threaded hole is disengaged.

19. An insert for sealing a hole having a diameter comprising:

a plug including a sleeve, a core, and a pin, the sleeve having a length and a void, the sleeve being metallic;

the core and the pin positioned in the void at opposite ends of the void;

the core having a first length, a first tapered outer wall, and a threaded hole extending partly but not all the way through the core;

the pin having a second length, a second tapered outer wall, and a passage extending there-through;

wherein the core and pin are configured to be moved together to thereby expand the sleeve against the hole to seal the hole, and the insert is configured such that the hole is sealed after the passage of the pin is vacant wherein the length of the sleeve is longer than the first length of the core and the second length of the pin.

20. The insert of claim 19, further comprising protrusions located on an outer surface of the sleeve.

21. The insert of claim 19, wherein each of the first and second lengths are approximately equal to one-half the length of the sleeve.

22. The insert of claim 19, further comprising a stop located on an end of the core, the stop inhibiting the core from being pulled into the sleeve beyond the stop to enable the pin to be forced into the sleeve when the core and sleeve are pulled together.

23. The insert of claim 19 wherein the first and second lengths are equal.

* * * * *